May 3, 1966 PALLE-FINN BEER 3,249,360

ARRANGEMENT IN AN APPARATUS FOR RECORDING AND REPRODUCING SOUND

Filed Feb. 12, 1962

INVENTOR
PALLE-FINN BEER

BY Larson and Taylor
ATTORNEYS

United States Patent Office 3,249,360

Patented May 3, 1966

3,249,360

ARRANGEMENT IN AN APPARATUS FOR RECORDING AND REPRODUCING SOUND

Palle-Finn Beer, Lidingo, Sweden, assignor to Svenska Aktiebolaget Gasaccumulator, Lidingo, Sweden, a corporation of Sweden Filed Feb. 12, 1962, Ser. No. 172,675
Claims priority, application Sweden, Feb. 16, 1961, 1,593/61
1 Claim. (Cl. 274—9)

In apparatus for recording and reproducing sound, the sound record is usually driven from a driving shaft with the aid of an intermediate wheel, which is in frictional contact with the sound record as well as with the driving shaft. Particularly in a case where the sound record comprises a layer of magnetizable material and the intermediate wheel is in contact with this layer, difficulties may arise owing to the formation of depositions on the intermediate wheel, which may cause uneven transfer of the driving force from the shaft to the record. As a result of this, fluctuations may occur in the speed of the record and impair the quality of the reproduction. Similar difficulties may also arise owing to the handling of the sound record, for instance in connection with its insertion into or removal from the apparatus.

According to the invention, this disadvantage is obviated by arranging the intermediate wheel relative to the sound record and the driving shaft in such a way that one drive surface on the intermediate wheel cooperates only with the record, whereas another drive surface thereof cooperates only with the shaft. This arrangement may be realized in a suitable manner by making the intermediate wheel turn on an axle which is inclined either relative to the plane of the sound record as well as the driving shaft or relative to only one of these.

Figure 1:
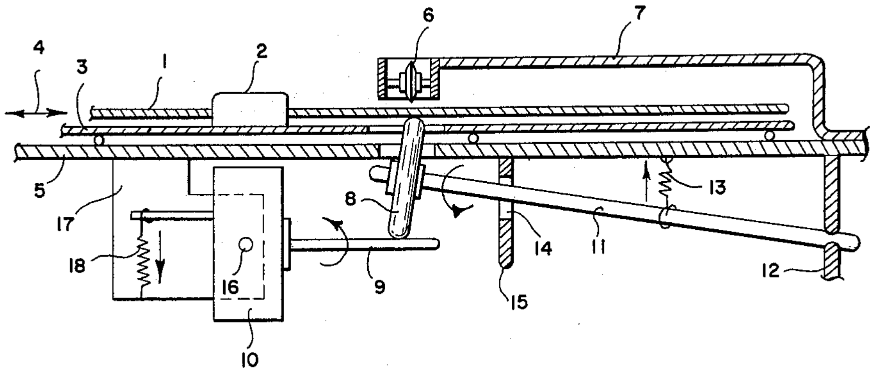
Figure 2:
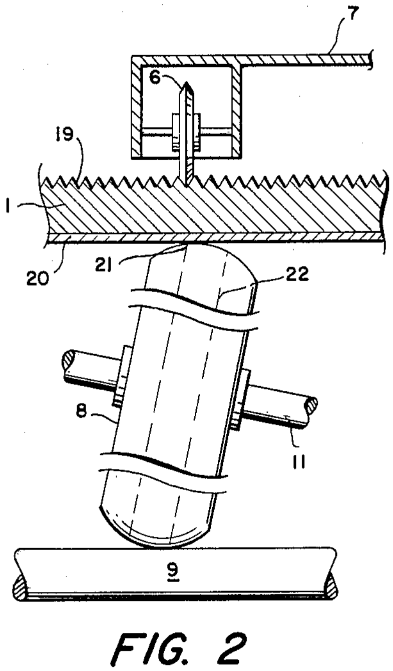

The invention will be described in more detail with reference to the attached drawings, wherein FIG. 1 shows the essential elements of an apparatus for recording and reproducing sound according to the invention, and FIG. 2 is an enlarged detail view of a portion of the structure shown in FIG. 1.

The sound record is assumed in the present instance to be a disc 1 which rotates on an axis 2. The axis is supported by a sliding member 3 which is assumed to be reciprocable in the direction of the arrows 4 relative to a bottom plate 5 of the apparatus for supporting the member 3. In the embodiment of the invention illustrated, the sound record 1 is assumed to be of the type provided on one side thereof, in the present case the upper side, with a spiral guide groove 19 and on the other side with a magnetizable coating 20 for recording and reproducing the sound. Adapted to cooperate with the guide groove on the upper side is a rotatable guide roller 6 which is supported by an arm 7 connected with the bottom plate 5. On the opposite side of the sound record 1 relative to the guide roller 6, an intermediate wheel 8 contacts the record and transfers rotational movement thereto owing to frictional contact between the intermediate wheel and a driving shaft 9. This shaft may be that of an electrical motor 10.

The intermediate wheel 8 is rotatable relative to an axle 11 which is supported in a member 12 connected with the bottom plate 5 and is acted on by a spring 13 tending to bring the axle 11 with the intermediate wheel into frictional contact with the sound record 1. Furthermore, the axle 11 is guided in a slot 14 provided in a plate 15 mounted on the bottom plate. Finally, the motor 10 is pivotally journaled as indicated at 16 in a supporting member 17 connected with the bottom plate, the motor being subjected to the action of a spring 18 tending to swing it so as to maintain suitable friction contact between the driving shaft 9 and the intermediate wheel 8.

The elements serving to record and reproduce sound on the magnetizable coating 20 of the record 1 are not within the scope of present invention and have not been shown on the drawing. However, these elements may be of any conventional construction. Depositions may be formed on the intermediate wheel 8, particularly in a case when the intermediate wheel is in contact with a magnetizable coating 20 on the underside of the record carrier 1, and these depositions may alter the friction between the intermediate wheel 8 and the record 1 as well as between the intermediate wheel 8 and the driving shaft 9. This may cause the speed of the record 1 to be variable and lead to impaired quality in the reproduction. To obviate this disadvantage, the intermediate wheel 8 has been arranged to have a drive surface 21 thereof indicated on the drawing with a dash-dot line cooperating only with the record 1, whereas a second drive surface 22 of the intermediate wheel 8 illustrated on the drawing with a dash line, cooperates only with the driving shaft 9. The intermediate wheel 8 turns on the axle 11, which is inclined relative to the plane of the record 1 as well as to the driving shaft 9. This has been obtained by placing the point at which the axle 11 is supported in the member 12 at a larger distance from the bottom plate 5 than the centre of the drive wheel 8.

This arrangement causes possible depositions on the intermediate wheel 8 with their origin on the record 1 to be limited to the driving surface 21 marked in dash-dot lines, so that they cannot be transferred to the driving shaft 9. Positive frictional contact will therefore be continuously maintained between the intermediate wheel 8 and the driving shaft 9. Such contact is extremely important because of the relatively small contact surface between the intermediate wheel 8 and the driving shaft 9.

What I claim is:

In an apparatus for recording and reproducing sound, a disc-shaped sound record having a layer of magnetizable material, means supporting said sound record for rotation about an axis perpendicular to its plane, a driving shaft rotating at a constant speed and lying in a plane parallel to the plane of said sound record, an intermediate wheel in frictional contact with said layer of magnetizable material and with said shaft for transferring driving force from said shaft directly to said sound record, means supporting said intermediate wheel for free rotation about an axis inclined to said parallel planes, one annular part of the periphery of said wheel engaging said layer of magnetizable material and a separate annular part of said periphery axially displaced with regard to said first annular part engaging said shaft.

References Cited by the Examiner

UNITED STATES PATENTS

| | | | |
|---|---|---|---|
| 2,230,003 | 6/1941 | Mitchell | 274—39 |
| 2,463,513 | 3/1949 | Brubaker | 274—39 |

FOREIGN PATENTS

| | | |
|---|---|---|
| 494,987 | 4/1950 | Belgium. |

OTHER REFERENCES

German printed application, 1,112,646, August 10, 1961.

LOUIS J. CAPOZI, *Primary Examiner.*

ANTONIA F. GUIDA, *Examiner.*